UNITED STATES PATENT OFFICE 2,066,076

PRODUCING VINYL ETHERS

Walter Reppe and Werner Wolff, Ludwigshafen-on-the-Rhine, Germany, assignors to I. G. Farbenindustrie Aktiengesellschaft, Frankfort-on-the-Main, Germany No Drawing. Application August 23, 1934, Serial No. 741,043. In Germany September 9, 1933

8 Claims. (Cl. 260—127)

The present invention relates to the production of vinyl ethers and is an improved modification of the process described in our U. S. patent No. 1,959,927.

Alkyl ethers of vinyl alcohol and its homologues may be obtained (according to the German Patent No. 338,281) by causing hydrocarbons of the acetylene series, preferably in the presence of mercury compounds, to act at temperatures below zero centigrade and under increased pressure on concentrated sulphuric acid, the vinyl sulphuric acid thus obtained being brought into reaction with alcohols. A direct formation of vinyl ethers by the addition of acetylene and its homologues on to alcohols has been suggested in the British Patent No. 231,841, but the yields are not very satisfactory. Under a great variety of conditions ethers of ethylidene glycol (acetals) are always obtained, as for example when employing mercury salts when working in the liquid phase according to British Patent No. 14,246, A. D. 1913, or when working in the gaseous phase, if desired in the presence of metals or their oxides or salts according to the German Patent No. 403,784. More recently, in the preparation of acetals from acetylene and mono- or polyhydric alcohols, the use as catalysts of solutions of boron fluoride and of silicon fluoride in aliphatic alcohols to which mercury oxide has been added has been recommended (see Chem. Centralblatt 1930, I. 2870; II. 1687).

We have now found that contrary to expectation, vinyl ethers are obtained in almost quantitative yields by reacting acetylene in the gas phase with a volatilized organic compound containing one free alcoholic hydroxyl group while employing substances having a strongly alkaline reaction as catalysts. This fact is surprising because it would have been expected that on working in the gas phase the vinyl ethers first formed would be changed into acetals by addition of a further molecule of the alcoholic compound employed.

The said compounds containing one free alcoholic hydroxyl group should not contain alkali-sensitive groups, i. e. easily exchangeable halogen groups, ketone, aldehyde, carboxyl and nitro groups which might react with the alkali in an undesired manner.

As catalysts having a strongly alkaline reaction suitable for the present process may be mentioned, for example, alkali metal oxides, hydroxides and cyanides as for example those of sodium, potassium, lithium, rubidium and cesium, alkali zincate, and the alcoholates, phenolates and naphtholates of the alkali metals. The corresponding alkaline earth metal compounds might be employed, but in most cases they are not sufficiently active for working on a commercial scale. On the other hand the alkaline earth metal oxides have been found to be excellent carriers for the catalysts mentioned above. Thus for example sodium lime is an excellent catalyst for the purposes of this invention. Other carriers, especially those having a large surface, such as active carbon, may be employed. The said catalysts may also be incorporated with mercury compounds, such as mercury oxide, sulphate or phosphate, but the co-employment of the latter leads to a slight acceleration of the reaction only and is therefore generally dispensed with.

The organic compounds containing one free alcoholic hydroxyl group may be chosen from volatile monohydric aliphatic and cyclic, i. e. hydroaromatic and aralkyl alcohols, and from volatile partially etherified or partially esterified polyhydric alcohols. Specific compounds of these types are, for example, alcohols, such as methanol, ethanol, n- and iso-propanol, butanols, hexanols, octanol, decanol, benzyl alcohol, 1-phenyl-3-propanol, cyclohexanol, the mono-ethers, such as mono-methyl, -ethyl, -butyl and -phenyl ethers and the corresponding ethers of polyhydric alcohols containing one free hydroxyl group, such as the di-alkyl ethers of glycerol. Further compounds suitable for the present process are the amino-alcohols, as for example ethanol- or -propanol-amine or mono-alkyl alkylol amines, such as N-methyl ethanol amine, or N-cyclohexyl ethanol amine.

The reaction temperature lies between 150° and 350° C., temperatures between 250° and 300° C. being especially suitable; it is not advisable to employ temperatures above 350° C. because they promote the formation of acetals and of polymerization products of the acetylene itself. The acetylene may be diluted by inert gases, such as nitrogen, but such a dilution is not necessary to overcome the explosion range of the acetylene, because in the present case the gaseous alcoholic compounds themselves act as diluents of the acetylene. In most cases an addition of a further diluent reduces the speed of the reaction to an undesirable degree. It is a special advantage that according to the present invention the reaction takes place at atmospheric pressure at a speed which is satisfactory in practice; in the case of alcohols of very low boiling point, such as methanol, increased pressure may be employed, but even in this case the reaction may be completed even at reduced pressure, although this will usually not be done.

The preparation of the ethers may be readily carried out on an industrial scale by leading the mixture of acetylene and the compound containing one free alcoholic hydroxyl group through a heated tube or tower which contains the catalyst. The acetylene used up in the reaction is continuously replenished and a part of the circulating mixture of acetylene and nitrogen is continuously withdrawn, in order to counteract the enrichment of foreign gases by reason of the supply of commercial acetylene which is not 100 per cent in strength. The reaction product is continuously withdrawn at the end of the tower opposite to the inlet, fractionally distilled and the unconverted fraction returned to the tower. By the known catalytic hydrogenation of the vinyl ethers in the liquid phase, preferably in the presence of solvents, such as methanol or ethanol, or in the gaseous phase with the usual hydrogenating catalysts, the saturated ethers may be obtained. Thus, for example, ethylene glycol diethyl ether, which hitherto could only be obtained in a troublesome manner by way of the sodium compound of ethylene glycol monoethyl ether by means of diethyl sulphate or halogen ethyl, is readily obtained from ethylene glycol monoethyl ether by way of the ethylene glycol ethyl vinyl ether.

The following example will further illustrate how this invention may be carried out in practice but the invention is not restricted to this example.

*Example*

A mixture of normal-butanol vapor and acetylene in the ratio of 2:1 by volume is led through a tube charged with commercial soda lime and heated to 265° C. at the rate of 50 liters per hour per liter of the catalyst. The acetylene is practically completely converted. 60 grams of vinyl normal-butyl ether are obtained per hour per liter of catalyst in addition to the excess of unchanged butanol. The unconverted butanol is supplied again to the reaction tube.

Instead of soda lime, carbon impregnated with potassium hydroxide, sodium zincate or another alkali may be employed as the catalyst.

In an analogous manner vinyl methyl ether may be obtained from methanol, vinyl normal-propyl ether from normal-propanol, vinyl iso-propyl ether from iso-propanol, vinyl amyl ether from amyl alcohol obtained by fermentation, vinyl cyclohexyl ether from cyclohexanol and vinyl benzyl ether from benzyl alcohol.

What we claim is:—

1. In the catalytic production of vinyl ethers from mixtures of acetylene and alcohols, the step which comprises reacting acetylene in the gas phase with a volatilized compound containing one free alcoholic hydroxyl group, which compound is free from alkali-sensitive groups, in the presence of a substance selected from the group consisting of the strongly alkaline reacting compounds of the alkali and alkaline earth metals as a catalyst.

2. In the catalytic production of vinyl ethers from mixtures of acetylene and alcohols, the step which comprises reacting acetylene in the gas phase with a volatilized compound containing one free alcoholic hydroxyl group which compound is free from alkali-sensitive groups, in the presence of a strongly alkaline reacting alkali metal compound.

3. In the catalytic production of vinyl ethers from mixtures of acetylene and alcohols, the step which comprises reacting acetylene in the gas phase with a volatilized compound containing one free alcoholic hydroxyl group which compound is free from alkali-sensitive groups, in the presence of a substance selected from the group consisting of the strongly alkaline reacting compounds of the alkali and alkaline earth metals as a catalyst, the catalyst being deposited on a carrier.

4. In the catalytic production of vinyl ethers from mixtures of acetylene and alcohols, the step which comprises reacting acetylene in the gas phase at a temperature between 150° and 350° C. with a volatilized compound containing one free alcoholic hydroxyl group which compound is free from alkali-sensitive groups, in the presence of a substance selected from the group consisting of the strongly alkaline reacting compounds of the alkali and alkaline earth metals as a catalyst.

5. In the catalytic production of vinyl ethers from mixtures of acetylene and alcohols, the step which comprises reacting acetylene in the gas phase at a temperature between 250° and 300° C. with a volatilized compound containing one free alcoholic hydroxyl group which compound is free from alkali-sensitive groups, in the presence of a substance selected from the group consisting of the strongly alkaline reacting compounds of the alkali and alkaline earth metals as a catalyst.

6. In the catalytic production of vinyl ethers from mixtures of acetylene and alcohols, the step which comprises reacting acetylene in the gas phase with a volatilized alcohol selected from the group consisting of the monohydric alcohols of the aliphatic hydroaromatic and aralkyl alcohols, in the presence of a substance selected from the group consisting of the strongly alkaline reacting compounds of the alkali and alkaline earth metals as a catalyst.

7. In the catalytic production of vinyl ethers from mixtures of acetylene and alcohols, the step which comprises reacting acetylene in the gas phase with a volatilized etherified polyhydric alcohol still containing one free alcoholic hydroxyl group, which derivative is free from alkali-sensitive groups, in the presence of a substance selected from the group consisting of the strongly alkaline reacting compounds of the alkali and alkaline earth metals as a catalyst.

8. In the catalytic production of vinyl ethers from mixtures of acetylene and alcohols, the step which comprises reacting acetylene in the gas phase with a volatilized amino-alcohol free from alkali-sensitive groups, and containing one free hydroxyl group, in the presence of a substance selected from the group consisting of the strongly alkaline reacting compounds of the alkali and alkaline earth metals as a catalyst.

WALTER REPPE.
WERNER WOLFF.